Feb. 23, 1971   H. W. NUDD, JR., ET AL   3,564,923
DIFFERENTIAL PRESSURE MEASURING APPARATUS
Original Filed Sept. 8, 1967   4 Sheets-Sheet 1
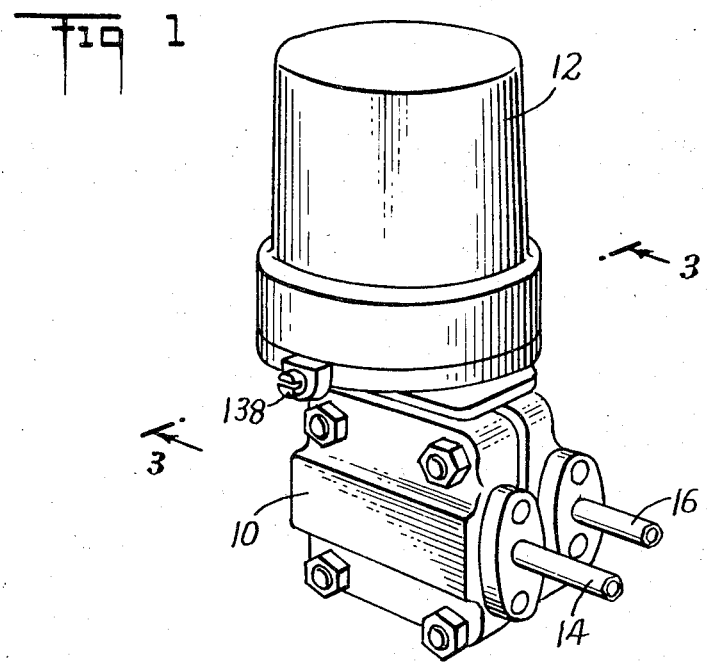
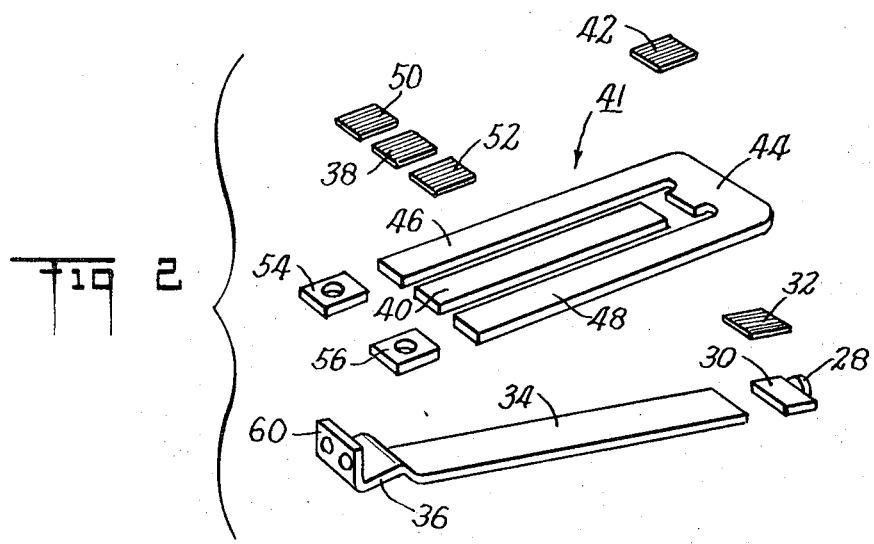
INVENTORS
Howard W. Nudd
Robert J. Robinson
James W. Graham
BY
Curtis, Morris + Safford
ATTORNEYS

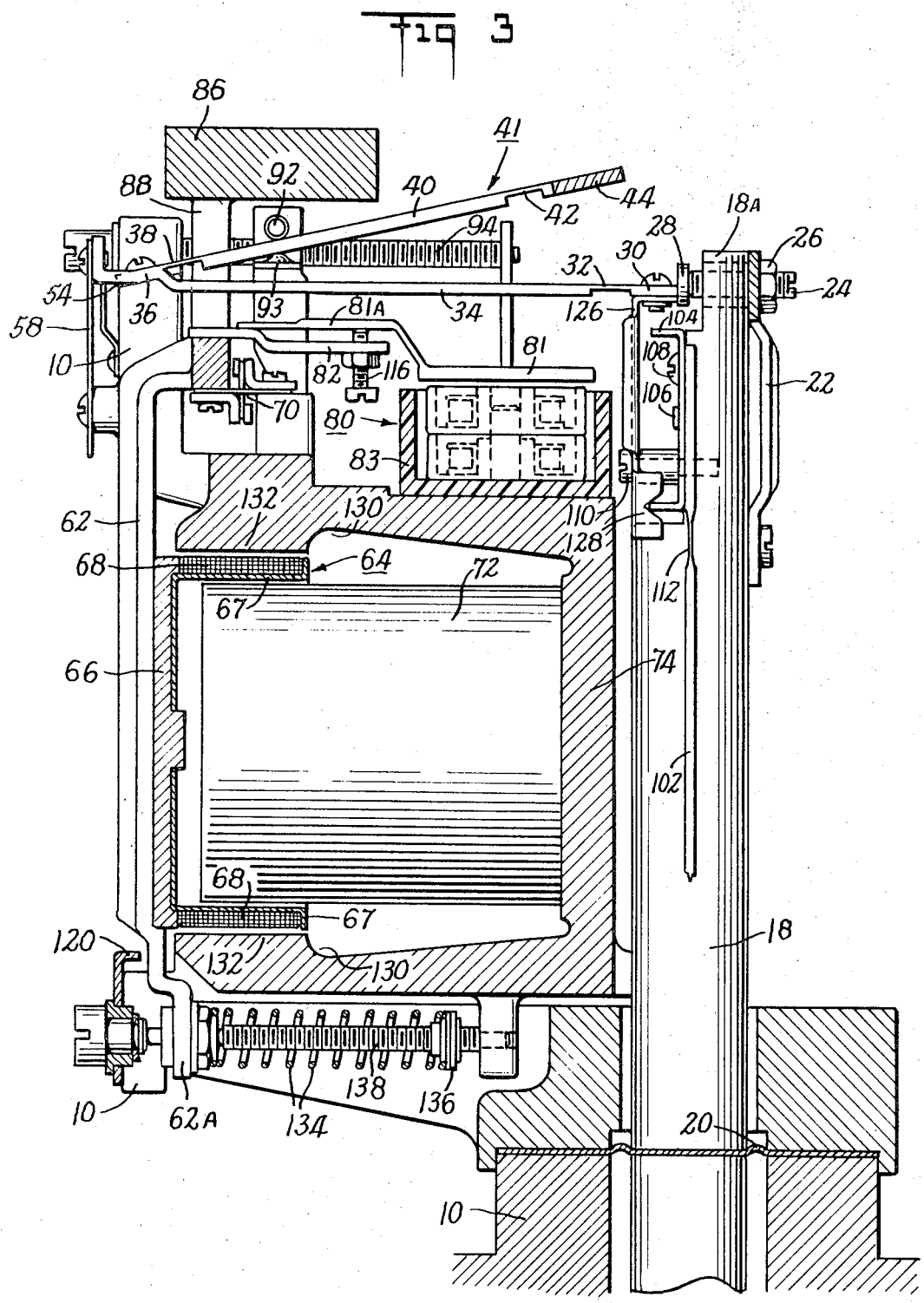

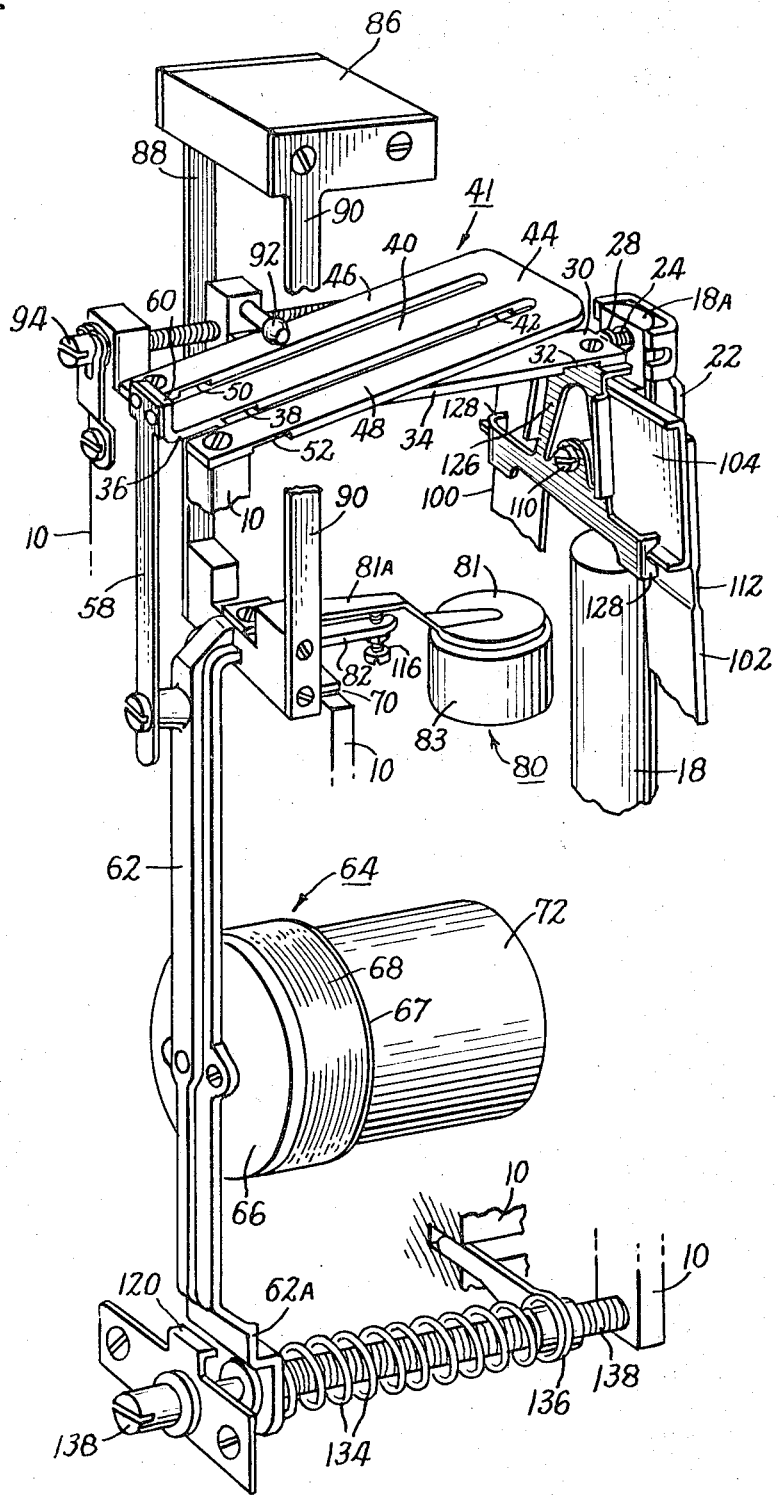

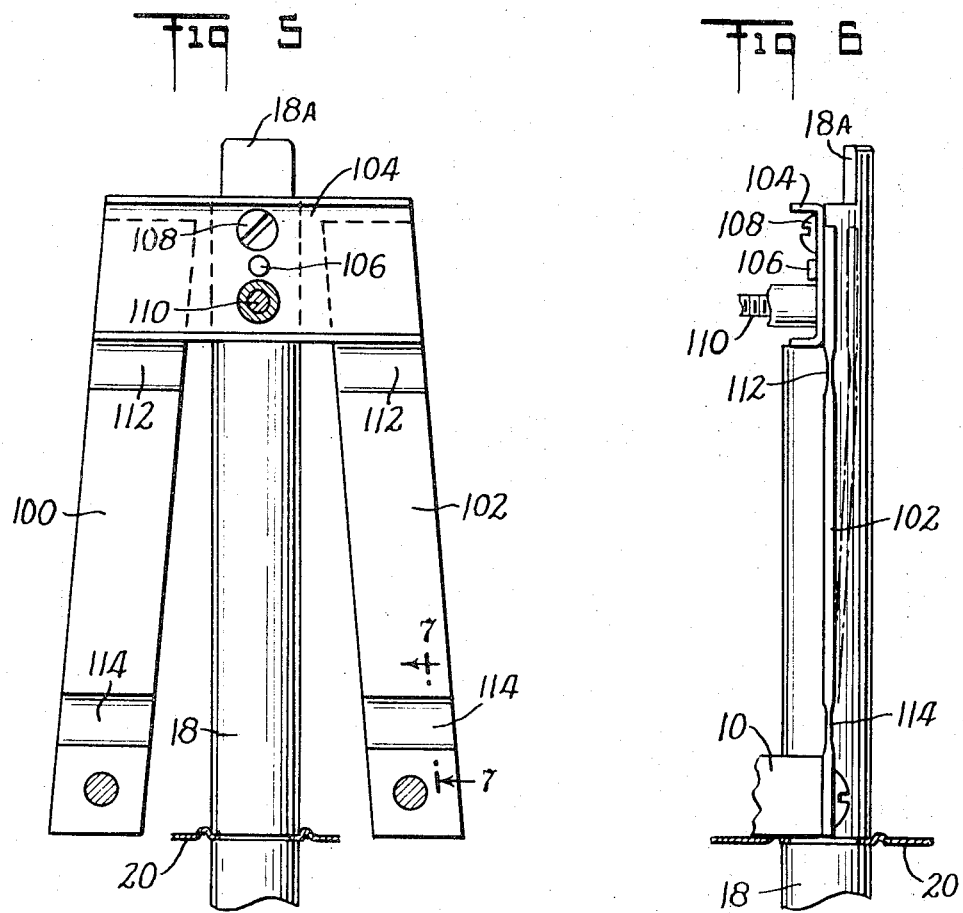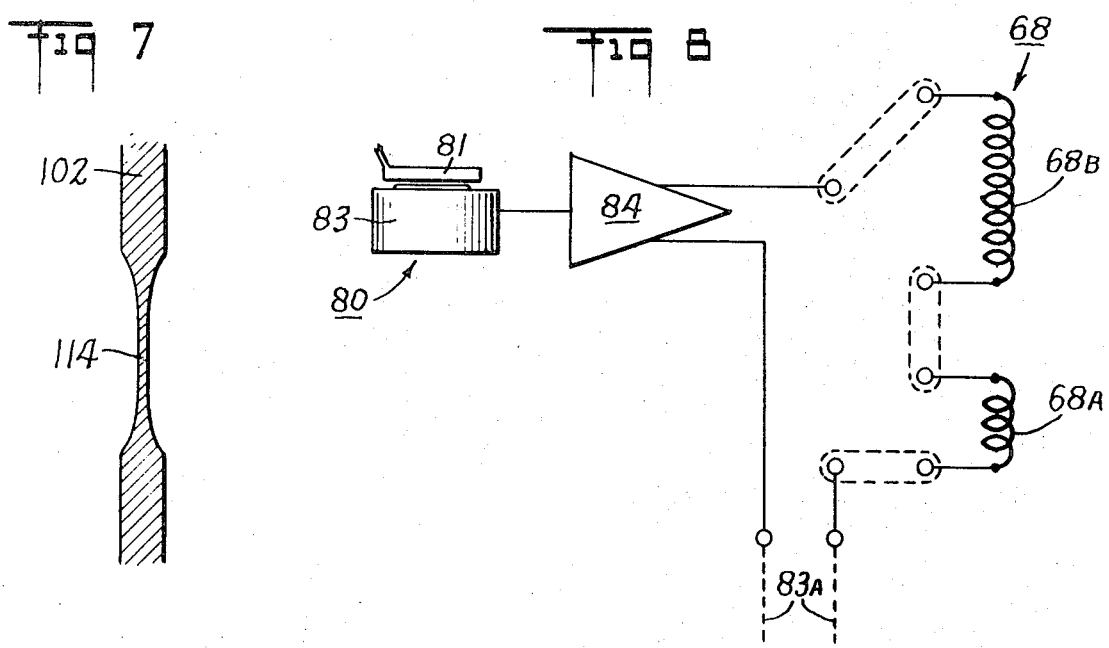

United States Patent Office 3,564,923
Patented Feb. 23, 1971

3,564,923
DIFFERENTIAL PRESSURE MEASURING
APPARATUS
Howard W. Nudd, Jr., Foxboro, Robert J. Robinson,
Lexington, and James W. Graham, Foxboro, Mass.,
assignors to The Foxboro Company, Foxboro, Mass.
Continuation of application Ser. No. 666,422, Sept. 8,
1967. This application Jan. 12, 1970, Ser. No. 1,967
Int. Cl. G01l 9/10
U.S. Cl. 73—398
19 Claims

ABSTRACT OF THE DISCLOSURE

A differential-pressure transmitter to produce a D-C output signal corresponding to a difference in input pressures, the instrument having a force-balance mechanism which is statically balanced to permit operation in any angular orientation with respect to gravity, the force-balance mechanism including a vernier range-changing structure in the form of a flexured reaction element and rotatable support element adapted to change range without altering the static balance of the instrument, large changes in range being effected by changing the number of effective turns of the motor winding; there also being provided a force bar support structure including struts pivoted at precisely defined positions; the instrument further including a rebalance motor having a cylindrical permanent magnet and surrounding magnetic material recessed near the motor windings to reduce leakage flux.

---

This application is a continuation of application Ser. No. 666,422 filed Sept. 8, 1967 now abandoned.

This invention relates to differential pressure measuring apparatus. More particularly, this invention relates to an improved differential pressure instrument adapted for use with industrial processes to produce an output signal suitable for transmission to a remote point for operating indicating, recording or control equipment.

Differential pressure measuring instruments have been utilized in various forms for many years, most frequently for producing measurement signals corresponding to the rate of fluid flow in pipes. Recently the most successful differential pressure instruments have been of the so-called force-balance type. In such instruments, an input force corresponding to the differential pressure is applied to a balanceable member together with a rebalance force the magnitude of which is automatically controlled by feedback so as to maintain the forces on the balanceable member in balance. The motion of the balanceable member typically is extremely small, for example less than .001" over the full operating range of the instrument. Consequently, such an arrangement offers certain unique advantages in providing accurate measurement.

Although such force-balance instruments have in general furnished excellent service, they have nevertheless suffered certain disadvantages which have somewhat limited their applicability. For example, prior instruments have had an undesirably high sensitivity to positional orientation and to vibration. Other aspects of prior instrument design also have needed improvement, including sensitivity to ambient temperature changes, ease of operation and adjustment, and economy of manufacture.

Accordingly, it is a general object of this invention to provide a differential pressure measuring instrument which is superior to those available heretofore. It is a more specific object of this invention to provide such an instrument having reduced sensitivity to positional orientation and vibration. Yet another object of this invention is to provide such an instrument having improved stability and reliability over long periods of time. Other objects, aspects and advantages of the invention will in part be pointed out in, and in part apparent from, the following description considered together with the accompanying drawings, in which:

FIG. 1 is a perspective view showing a differential pressure measuring instrument constructed in accordance with the present invention;

FIG. 2 is an exploded view of a three-element flexure structure used as a vernier adjustment for setting the range of the instrument;

FIG. 3 is a vertical cross-section showing the principal operating components of the instrument;

FIG. 4 is a perspective view, exaggerated vertically, illustrating the inter-relationships between the principal operating components;

FIG. 5 is an elevational view of the force-bar support struts;

FIG. 6 is an edge-on view of one of the force-bar support struts;

FIG. 7 is a detail cross-section showing the swaged flexure section of the support strut; and FIG. 8 is a schematic diagram of the motor control circuitry.

Referring now to FIG. 1, the instrument includes a lower hermetically sealed casing 10 or base containing the usual pressure-responsive diaphragm assembly (not shown), and an upper housing 12 serving as a cover for the operating mechanisms to be described. Connected to the base are two pipes 14 and 16 carrying fluid under pressure. For example, these pipes might be connected at their remote ends upstream and downstream of an orifice plate inserted in a pipeline, so that the differential pressure between the two pipes corresponds to the rate of fluid flow through the pipe. The instrument typically may be mounted directly on the pipeline, e.g. at a point remote from a central control station where the measurement data is to be sent.

Referring now to FIG. 3, extending down into the base 10 is a vertical force-bar 18 to be coupled at its lower end to the usual pressure-responsive diaphragm (not shown) which develops a force proportional to the magnitude of the differential pressure. The force-bar is mounted for slight pivotal motion with respect to the base by an annular seal-out diaphragm 20. In normal operation the differential pressure tends to rotate the force-bar counter-clockwise, so that the top of the bar 18A tends to move to the left.

Secured to the force-bar near the upper end thereof is a stiff elongate overrange spring 22 the upper end of which is shaped to embrace and press against the force-bar under the spring tension, so that in normal operation the force-bar and spring move as an integral unit. Threaded into this spring is a stud 24 which extends through a hole in the force-bar having a diameter slightly larger than that of the stud. The axial position of the stud relative to the overrange spring 22 is adjustable and is fixed by a lock nut 26.

The left-hand end of the stud 24 presses against the flat face of a disc 28 attached to a horizontal plate 30. This plate, in turn, is connected by a short flexure strip 32 to a rigid horizontal link 34 which may be considered the balanceable member of the force-balance system to be explained in more detail hereinbelow. The force-bar stud 24 applies a horizontally-directed input force to this member 34 tending to move it to the left.

As shown most clearly in FIG. 2, the left-hand end of link 34 is formed with an angularly offset segment 36 which is secured by a flexure strip 38 to one end of an elongate reaction element 40 forming part of a three-element flexure assembly generally indicated at 41. The other end of reaction element 40 is connected by a flexure strip 42 to a U-shaped yoke member comprising a cross piece 44 and a pair of elongate outer elements 46 and 48 extending along opposite sides of and parallel to the central reaction element 40. The ends of the outer elements 46 and 48 are coupled by respective flexure strips 50 and 52 to plates 54 and 56 secured to frame posts integral with the base 10 of the instrument.

Cross-piece 44 serves as a support element for pivotal movement of the reaction element 40 about the pivot axis defined by flexure 42. The input force applied by the force bar 18 to the link 34 tends to cause the reaction element 40 to rotate clockwise about flexure 42, so that the left-hand end of this link tends to move with an upward component of motion. It will be evident that the angle of the reaction element with respect to link 34 determines the relative magnitude of this upward component of motion.

The upward component of motion of the link 34 due to the horizontally-directed input force is opposed by a downwardly-directed rebalance force applied by an elongate flexible strip 58 connected to the upstanding end 60 of link 34. As shown particularly in FIG. 4, the lower end of this flexible strip is pinned to an L-shaped lever 62 carrying a motor armature 64 comprising a disc 66 of insulating material (e.g. Nylfil) supporting a cylindrical aluminum bobbin 67 having electrical windings 68. Lever 62 is secured to the instrument frame by cross-flexures 70 (FIG. 3) providing a sharply-defined pivot axis for motion of the lever. The lever 62 is a single-piece casting, and the use of a single pivot point, rather than two as provided in prior instruments, provides operational advantages.

The motor windings 68 are positioned in a circular air gap between one end of a cylindrical magnet 72 and adjacent magnetic material 74 providing a flux return path. Flow of current through the motor windings produces a force on the armature 64 tending to rotate the lever 62 counter-clockwise about the pivot axis 70, thereby to apply a downwardly-directed force to flexible strip 58. The magnitude of the downward force necessary to rebalance the input force from the force-bar 18 depends upon the angle between the reaction element 40 and the link 34. Specifically, it can readily be shown that the downward force will be equal to the input force multiplied by the tangent of that angle. In the disclosed embodiment, the nominal angle (i.e. the angle at which flexure 38 is in its neutral unstressed state) is about 13 degrees, and at this angle the downward force is slightly less than one-fourth the input force.

The downward force applied by flexible strip 58 is maintained at the correct magnitude by a feedback arrangement which includes a detector 80 responsive to the position of a paddle 81 on the end of a vertically-adjustable flexible strip 81A secured to an arm 82 forming part of the lever 62. Detector 80 may be of a conventional type such as that utilizing a differential transformer device as disclosed in U.S. Pat. 2,956,212.

The detector operates with a solid-state amplifier 84 (FIG. 8) to produce a D-C control signal for the motor coils 68. An electronic amplifier circuit suitable for this purpose is disclosed in U.S. Pat. 3,051,933. As shown in that patent, the control current for the motor coil also serves as the output signal, and is directed through a pair of wires 83A to a remote station where it serves to actuate indicating, recording or control apparatus in accordance with the measured pressure differential.

In order to minimize variations in output signal with changes in angular orientation of the instrument, the operating mechanisms are statically balanced about the pivot axis of the cross-flexures 70. This is accomplished specifically in the present embodiment of the invention by a counterweight block 86 secured by a pair of arms 88 and 90 to the L-shaped lever 62. The proper position for this block can be determined by mounting the instrument on a tilt table and rotating it 360 degrees through the vertical plane of the L-shaped lever 62, i.e. the plane which is perpendicular to the pivot axis of that lever. The proper counterbalance position is that providing minimum change in output signal with such rotation, and can be located simply by varying the horizontal block position until the output change is minimum in going between 0° and 180° orientations, and then varying the vertical block position until the output change is minimum in going between 90° and 270° orientations.

The construction of the force-bar 18 and its associated support elements ordinarily will be such as to provide at least very nearly a static balance about the pivot axis defined by seal-out diaphragm 20. Thus, the counterweight 86 serves essentially to statically balance the remainder of the mechanism (primarily the motor armature 64) to the left of the force-bar.

An important aspect of the present invention concerns the ability to change the operating range of the instrument without altering the static balance of the force-handling mechanism. Thus, the balance established by counterweight 86 will be maintained at all range settings, so as to ensure maintaining the relative insensitivity of the instrument output to changes in angular orientation.

To achieve this result, a continuous "vernier" range change is effected by adjusting the angular position of the reaction element 40 from its initial non-flexed angle of about 13° down to an angle of about 6°. This adjustment is made by cantilevered wheel-shaped part 92 and a cooperating part in the form of a slightly flexible dimple 93. These parts together engage the top and bottom of outer element 46, and are arranged to be shifted axially along element 46 by a lead screw 94 rotatable manually with a screw-driver. As the lead screw advances parts 92 and 93 to the right, the support element 44 is moved down correspondingly to reduce the angle between the reaction element 40 and link 34. Thus, the magnitude of rebalance force required for a given input force will be reduced correspondingly, thereby increasing the range of the instrument. In the disclosed embodiment, the range can be changed in this fashion by a factor of about 2.5:1, e.g. from an operating range of 0–20″ to a range of 0–50″.

Larger changes in range are provided by making step changes in the motor force developed by the motor armature 64 for a given signal current. For this purpose, the motor windings are split into two sets 68A and 68B (see FIG. 8), the number of turns in set 68A being one-third the number in set 68B. The separate leads for each winding set are brought out to a terminal board so that the particular circuit connections can readily be altered by means of conventional links.

For the lower range of from 20″ to 50″, only the small winding 68A will be connected to the amplifier output. For the next step in range (50″ to 100″) both windings will be connected in series-opposition, thus providing the effect of a single winding having half the total number of available turns. For the last step, a range of 100″ to 200″, both windings will be connected in series-aiding, to provide full power.

With either a vernier change or a step change in range, as outlined above, there will be no variation in the established static balance of the force-handling mechanisms. Thus, the relative insensitivity of the instrument to changes in angular orientation and vibration will be maintained. It may also be noted that, if there is any slight unbalance of the force-bar portion of the mechanism, the flexure structure 41 will de-multiply such unbalance force by between 4:1 and 10:1 (depending on the angle setting of the reaction element), so that its effect will be substantially reduced.

Referring now to FIG. 5, the top of the force bar 18 is secured to a pair of support struts 100 and 102 the lower ends of which are fastened to the frame of the instrument. More particularly, these struts are welded at their tops to a C-shaped channel member 104 which is mounted on a load pin 106 carried by the force bar, and held in place horizontally by two bolts 108 and 110. With this arrangement, struts 100 and 102 carry the longitudinal load produced by the static pressure of the fluid tending to expel the force bar from the casing.

The use of support struts for this purpose is well known, as disclosed for example in U.S. Pat. 2,806,480. However, it has been found that the long relatively thin struts shown in that patent introduce certain operational problems, apparently in part because the struts cannot as a practical matter be made perfectly flat, and because such prior struts became contorted out of shape (e.g. into a somewhat S-shaped configuration as seen in edge view) as the force-bar was stroked through its throttle band, thereby introducing uncontrolled errors in the measurement.

In accordance with one aspect of this invention, such problems have been significantly minimized by a new construction wherein the struts are relatively thicker and essentially non-bendable throughout most of their length, and are provided with swaged reduced-thickness sections 112 and 114 near the tops and bottoms respectively to serve as bendable flexures providing well-defined horizontal bending axes. Thus as the force-bar 18 pivots through its throttle band, the struts bend about the localized regions represented by the flexure sections 112 and 114 to assume a somewhat Z-shaped configuration as exaggeratedly indicated in broken outline in FIG. 6. This provides a more uniform variation in spring force as applied to the force-bar, thereby improving the accuracy of measurement under varying conditions, especially under conditions of changing static pressure within the casing 10.

Measurement accuracy also is enhanced by a further feature which includes the use of a channel member 104 (i.e. a member having a C-shaped or U-shaped cross-section) as a cross-beam to attach the struts 100 and 102 to the force-bar 18, in place of the L-bar shown in the above U.S. Pat. 2,806,480. It has been discovered that apparently the previously used L-bar twisted under conditions of substantial static pressure, and caused errors in the final measurement. The use of a channel member minimizes this error by reducing the twisting. In addition, the load to the channel member now is carried by a small pin 106 which provides a sharply-defined load bearing line. This has been found to be superior to the relatively broad machined surface arrangement of the earlier construction, apparently because the position of load concentration in that latter arrangement was somewhat indefinite and subject to shifts laterally with changes in operating conditions.

The new constructional features of the strut and associated components reduce the static pressure error and, moreover, makes this error a generally linear function of static pressure. Thus it is possible to make the static pressure alignment (by adjusting the stud 24 longitudinally) at any pre-selected static pressure which need not be the same as the operating pressure to be used by the customer.

The instrument disclosed herein also includes means to prevent damage to the mechanism due to overrange in either direction. If for example the low pressure to the casing 10 somehow is disconnected, the now unopposed high pressure will jam the diaphragm against conventional back-up plates (not shown herein) and tend to push the link 34 far to the left (FIGS. 3 and 4). This in turn will rock the lever 62 clockwise. After the lever has moved only a short distance beyond its normal range, the detector paddle 81 strikes the detector case 83, and the flexible strip 81A bends to permit the lever arm 82 to continue its downward motion without damaging the detector. During this motion, the detector adjustment screw 116 carried by arm 82 becomes disengaged from flexible strip 81A.

After paddle 81 comes to rest under light spring pressure against detector case 83, lever 62 continues to rotate clockwise until its lower end 62A strikes a frame-mounted stop 120 thereby arresting further leftward movement of link 34. Since the application of full overrange force thereafter would seriously damage the mechanism, this overrange force must be diverted elsewhere. This result is accomplished by the heavy spring 22 which now bends to allow the force-bar 18 to continue to the left without carrying link 34 with it. Ultimately, the force-bar comes to rest when the pressure-responsive diaphragm in casing 10 has reached its back-up plate, and the force applied to the link 34 simply is that developed by spring 22. This spring force, although substantial, is not sufficient to injure the operating mechanisms of the instrument.

With overrange in the opposite direction, the lever 62 will rotate counter-clockwise beyond its normal operating range. The detector paddle 81 will move up away from the detector casing 83 without encountering interference, and the lever will continue to rotate until the motor armature 64 bottoms against the motor magnet structure. At this point, further rotation of the force-bar 18 clockwise causes the stud 24 to lift off from the disc 28. The force-bar is, however, not completely decoupled from link 34, because the disc plate 30 is bolted to a relative light spring 126 which in turn is fastened by the threaded bolt 110 to the force-bar, and held in alignment by the engagement of V-grooved ears 128 with the lower flange of channel member 104. This light spring 126 is provided primarily to maintain engagement between stud 24 and disc 28 in the presence of external vibration, and does not apply sufficient force to cause injury to the instrument mechanisms during overrange conditions.

Improved results in the disclosed instrument also are achieved by providing increased force from the motor armature 64 for a given magnitude of output current. More specifically, the cylindrical magnet 72 serves directly as the inner pole piece of the air gap, and provides more field strength than a dimensionally comparable conventional T-shaped arrangement of a radial pole piece disc mounted on the end of a smaller-diameter magnet. The use of the cylindrical magnet as the inner pole piece is made practical by shaping the surrounding magnetic material 74 with a scalloped recess 130 immediately adjacent the outer pole piece portion 132 of the return flux path. This recess reduces the leakage flux which otherwise would cross from the magnet 72 to the magnetic material 74 without passing through the windings 68. The overall result is that the motor delivers approximately 40% more force than the comparable voice-coil motor previously used, and thus affords correspondingly improved operating characteristics.

Adjustment of the instrument to "zero" is effected by a zero spring 134 which engages the lower end 62A of the lever 62. The other end of the zero spring is supported in compression by a nut 136 carried by a lead screw 138 providing a screw-driver adjustment of the zero setting from the front of the instrument. This spring is arranged to have a substantially greater compliance than zero spring arrangements previously used, and thus aids in reducing errors due to changes in ambient temperature.

While there has been described what is at present considered to be the preferred embodiment of this invention, it will be apparent to those skilled in the art that various changes and modifications may be made therein without departing from the scope of this invention; thus the showing herein is for the purpose of illustrating the invention to enable others skilled in this art to adopt the invention in such ways as meet the requirements of particular applications.

We claim:
1. A differential pressure measuring instrument for producing an output signal proportional to a differential pressure, comprising, in combination: sensing means responsive to the differential pressure and arranged to produce a corresponding input force; a balanceable member coupled to said sensing means to receive said input force along a predetermined direction; force-producing means coupled to said balanceable member to apply thereto a rebalance force in a direction transverse to said predetermined direction; a reaction element coupled at one point thereof to said balanceable member to control the movements of said balanceable member in response to any unbalance in forces thereon; a support element pivotally coupled to said reaction element at a point thereof remote from said one point to fix a pivot axis for movement of said one point; detector means coupled to said balanceable member to develop for said force-producing means a control signal responsive to movement of said balanceable member, said control signal being operative to set the rebalance force so as to maintain the total forces thereon in balance and to provide a corresponding output signal; counterbalance means coupled to said balanceable member to provide a balance of gravity force on said balanceable member in different angular orientations of the instrument; and mechanically-operable adjustment means for shifting said support element to move said pivot axis throughout a set of positions about said one point to vary the ratio of said rebalance and input forces and thereby controllably to change the operating range of the instrument without affecting said balance of gravity forces.

2. An instrument as claimed in claim 1, wherein said counterbalancing means serves to balance said gravity forces in two mutually perpendicular planes.

3. An instrument as claimed in claim 1, wherein said force-producing means comprises an electrically-operable motor having an armature of substantial weight coupled to said rebalanceable member; and flexure pivot means mounting said armature for small pivotal motion as the output force of the motor varies through its operating range.

4. An instrument as claimed in claim 3, including linkage means connected to said flexure means to carry said motor armature; and means connecting said detector means to said linkage means so that the detector and motor armature move directly together with a rotary motion about said flexure pivot means.

5. An instrument as claimed in claim 1, wherein said reaction element comprises an elongate arm, a flexure securing said reaction element to said rebalanceable member at a small angle with respect to said predetermined direction when the flexure is in its neutral state.

6. An instrument as claimed in claim 5, wherein said adjustment means is operable to rotate said reaction element so as to decrease said angle to approximately half its magnitude in the neutral state of said flexure.

7. A differential pressure measuring instrument for producing an electrical output signal proportional to a differential pressure, comprising, in combination: sensing means responsive to the differential pressure and arranged to produce a corresponding input force; a balanceable member coupled to said sensing means to receive said input force along a predetermined direction; force-producing means coupled to said balanceable member to apply thereto a rebalance force in a direction transverse to said predetermined direction, said force-producing means including a pivoted lever carrying a motor armature, means for producing a magnetic field for said armature, so that the armature develops a force on said lever corresponding to an applied electrical control signal; a reaction element coupled at one point thereof to said balanceable member to control the movements of said balanceable member in response to any unbalance in forces thereon; a support element pivotally coupled to said reaction element at a point thereof remote from said one point to fix a pivot axis for movement of said one point; detector means mounted on said lever; circuit means operable with said detector means to develop said electrical control signal responsive to movement of said balanceable member, said control signal serving to set the rebalance force so as to maintain the total forces on said balanceable member in balance and providing a corresponding output signal; counterbalance means coupled to said balanceable member to provide a balance of gravity force on said balanceable member in different angular orientations of the instrument in a plane perpendicular to the pivot axis for said lever; and mechanically-operable adjustment means for shifting said support element to move the pivot axis of said reaction element throughout a set of positions about said one point to vary the ratio of said rebalance and input forces and thereby controllably to change the operating range of the instrument without affecting said balance of gravity forces.

8. An instrument as claimed in claim 7, wherein said sensing means includes an elongate force-bar extending vertically up from a pressure casing; said balanceable member comprising a horizontally disposed link having one end engaged with the upper end of said force-bar to receive said input force therefrom; said reaction element comprising a rigid elongate element extending generally alongside said link; a flexure strip connecting said elongate element to the other end of said link to permit slight pivotal motion thereabout, said elongate element being positioned at a small angle with respect to said link when said flexure strip is in its unstressd neutral state; and flexure means aligned with said flexure strip and mounting said support element for pivotal movement under the control of said adjustment means, whereby said reaction element can be pivoted about said flexure strip to effect variations in said small angle.

9. An instrument as claimed in claim 8, wherein said lever is L-shaped having one leg to which said motor armature is attached and a second leg to which said detector means is attached; said counterbalance means being rigidly secured to said L-shaped lever.

10. A differential pressure measuring instrument comprising a pressure casing to be coupled to a fluid system to develop a first force proportional to a differential pressure; a force bar extending into said casing to receive said first force; a sealing diaphragm mounting said force bar for pivotal movement with respect to said casing and sealing off the static pressure of said fluid system; a pair of restraining struts extending alongside the part of said force bar which is outside said casing; means fastening said force bar to the tops of said struts; said struts being secured to said casing at their lower ends; said struts being relatively thick throughout substantially the entire length thereof, said struts further being formed with relatively thin flexure sections providing localized well-defined pivot regions for said struts to accommodate pivotal movement of said force bar about said sealing diaphragm.

11. An instrument as claimed in claim 10, wherein said thin flexure sections are adjacent the bottom of the struts; said struts further including additional relatively thin flexure sections near the tops thereof to join the struts to said force bar.

12. An instrument as claimed in claim 10, wherein said flexure sections are swaged portions of said struts providing a reduced thickness region integral with the remainder of the strut.

13. A differential pressure measuring instrument comprising a pressure casing to be coupled to a fluid system to develop a first force proportional to a differential pressure; a force bar extending into said casing to receive said first force; a sealing diaphragm mounting said force bar for pivotal movement with respect to said casing and sealing off the static pressure of said fluid system; a pair of restraining struts extending alongside the part of said force bar which is outside said casing, one end of said struts being secured to said casing; a channel member secured to said force-bar and extending out laterally adjacent to the tops of said struts; said channel member being generally C-shaped in cross-section with the outer surface of its broad central portion secured to said force-bar and aligned with the axis thereof; the upper ends of said struts being secured respectively to said outer surface at the outboard regions of said channel member central portion with said outer surface parallel to the center line of each strut, whereby each strut center line passes alongside said outer surface a small distance therefrom in a direction away from the interior of the channel member; said struts including flexure means to accommodate pivotal movement of said force-bar about said sealing diaphragm.

14. An instrument as claimed in claim 13, including a pin extending transversely from said forcebar to said channel member to carry at least substantially off of the longitudinal load to said struts.

15. A differential pressure measuring instrument for producing an output signal proportional to a differential pressure, comprising, in combination: sensing means responsive to the differential pressure and arranged to produce a corresponding input force; a balanceable member couple dto said sensing means to receive said input force along a predetermined direction; force-producing means coupled to said balanceable member to apply thereto a rebalance force in a direction transverse to said predetermined direction; a reaction element coupled at one point thereof to said balanceable member to control the movements of said balanceable member in response to any unbalance in forces thereon; a support element pivotally coupled to said reaction element at a point thereof remote from said one point to fix a pivot axis for movement of said one point; detector means coupled to said balanceable member to develop for said force-producing means a control signal responsive to movement of said balanceable member, said control signal being operative to set the rebalance force so as to maintain the total forces thereon in balance and to provide a corresponding output signal; first adjustment means for shifting said support element to move said pivot axis throughout a set of positions about said one point to vary the ratio of said rebalance and input forces and thereby controllably to change the effective span of the instrument; bias means to apply a bias force to said balanceable member; and second adjustment means for altering said bias force to controllably set the zero output condition for said instrument.

16. Apparatus as claimed in claim 15, wherein said force-producing means comprises a motor arranged to develop a force proportional to an applied signal corresponding to the output signal of the instrument; linkage means connecting said motor to said balanceable member to transmit the rebalance force thereto; said bias means comprising spring means connected to said linkage means.

17. Apparatus as claimed in claim 16, wherein said linkage means comprises a first rigid element connecting said motor to said detector means; flexure means supporting said rigid element for slight motions; and a flexible element connected between said rigid element and said balanceable member to transmit the force changes corresponding to said slight movements.

18. Apparatus as claimed in claim 17, wherein said balanceable member is supported for slight movement by second flexure means.

19. Apparatus as claimed in claim 17, wherein said bias means is connected to said rigid element.

References Cited
UNITED STATES PATENTS

| | | |
|---|---|---|
| 2,806,480 | 9/1957 | Bowditch. |
| 2,946,031 | 7/1960 | Steele. |
| 3,061,823 | 10/1962 | Crossley, Jr. |
| 2,141,464 | 12/1938 | Gorrie. |

S. CLEMENT SWISHER, Primary Examiner

U.S. Cl. X.R.

73—407; 74—18